United States Patent [19]

Bühlmann

[11] Patent Number: 4,501,707

[45] Date of Patent: Feb. 26, 1985

[54] PACKING FOR MATERIAL EXCHANGE COLUMNS

[75] Inventor: Ulrich Bühlmann, Allschwil, Switzerland

[73] Assignee: Kuhni AG, Switzerland

[21] Appl. No.: 395,996

[22] Filed: Jul. 7, 1982

[30] Foreign Application Priority Data

Jul. 8, 1981 [CH] Switzerland .................. 4480/81

[51] Int. Cl.³ ............................................. B01F 3/04
[52] U.S. Cl. ................................. 261/94; 29/163.5 R;
55/240; 55/489; 55/525; 202/158; 261/112;
261/DIG. 72; 428/596
[58] Field of Search .............. 261/94, 112, 95–98,
261/111, DIG. 72; 165/60; 202/158; 55/90,
240, 241, 525, 489, 233; 29/157 R, 163.5 R,
163.5 CW, 163.5 F; 428/596

[56] References Cited

U.S. PATENT DOCUMENTS

| | | | |
|---|---|---|---|
| 2,003,271 | 5/1935 | Beimann et al. | 261/111 |
| 2,018,085 | 10/1935 | Otte | 29/163.5 R X |
| 2,405,593 | 8/1946 | Melvill | 261/94 |
| 3,346,246 | 10/1967 | Loetel et al. | 261/112 X |
| 3,570,086 | 3/1971 | Stone | 29/163.5 R X |
| 3,878,594 | 4/1975 | Minor, Jr. | 29/163.5 R X |
| 4,105,724 | 8/1978 | Talbot | 261/112 |
| 4,186,159 | 1/1980 | Huber | 261/112 |
| 4,304,738 | 12/1981 | Nutter | 261/94 |
| 4,338,266 | 7/1982 | Flower | 261/94 |

FOREIGN PATENT DOCUMENTS

| | | | |
|---|---|---|---|
| 532764 | 3/1932 | Fed. Rep. of Germany | 261/94 |
| 551071 | 5/1932 | Fed. Rep. of Germany | 261/94 |
| 2005295 | 8/1971 | Fed. Rep. of Germany | |
| 734874 | 8/1955 | United Kingdom | 261/94 |
| 1285495 | 8/1972 | United Kingdom | 261/112 |

Primary Examiner—Richard L. Chiesa
Attorney, Agent, or Firm—Brady, O'Boyle & Gates

[57] ABSTRACT

A packing (11) consists of laminated grids (a,b, ...) placed directly against each other. Each grid (a,b, ...) consists of approximately zigzag-shaped laminated strips (13–17) which run in the direction of the flow (22), are inclined towards the grid plane and are formed jointly in one piece with areal crossing points (b 18). The laminated strips (13–17) have recesses (20, 21) at the outer edges of the crossing points (18). In this way, it is achieved that the liquid phase flowing down on a laminated strip to a crossing point is directed, at least partially, across the crossing point to the adjacent laminated strip. The packing which can be produced in a simple and inexpensive way has a high specific surface and distributes the liquid on all sides transversely to the direction of the flow (22) whereby the turbulence required for the surface renewal develops at the crossing points of the grids.

14 Claims, 17 Drawing Figures

Fig. 2
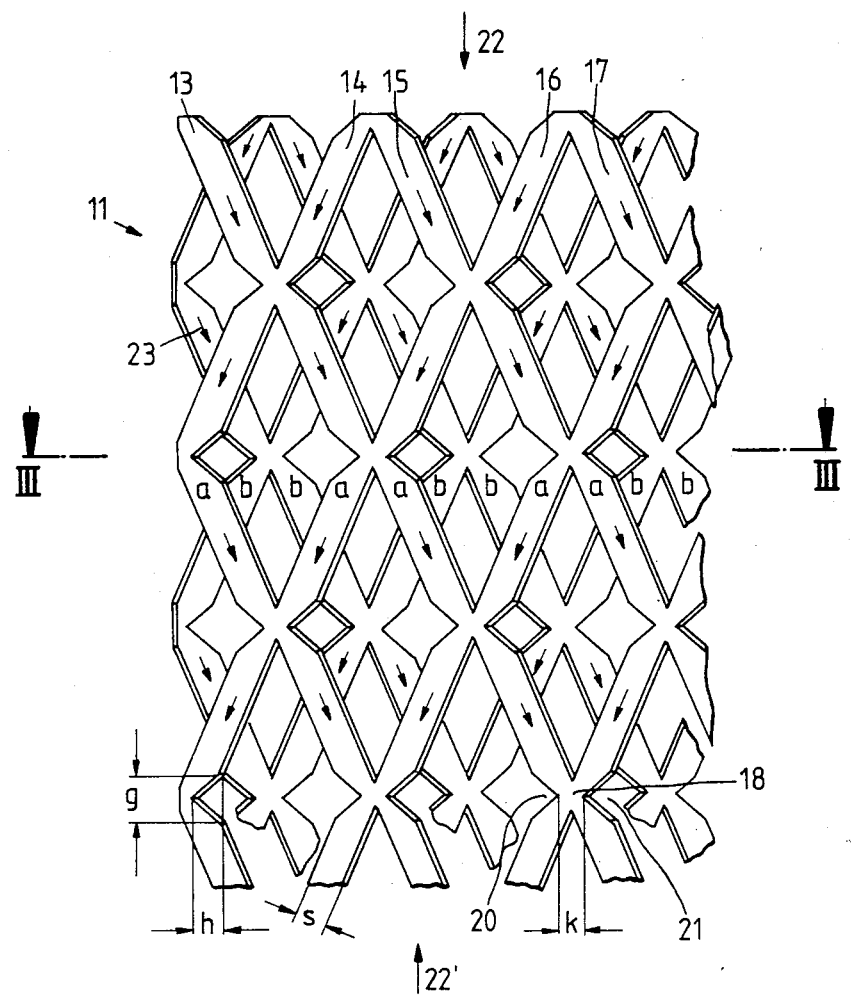
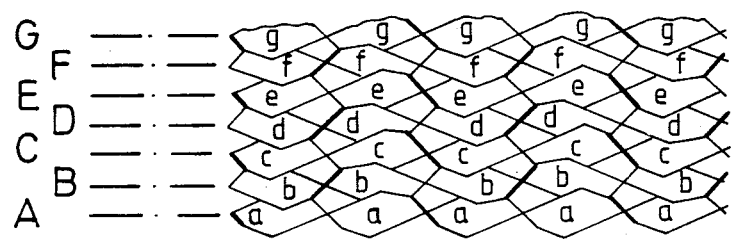
Fig. 3

PACKING FOR MATERIAL EXCHANGE COLUMNS

The invention concerns a packing for material exchange columns and a process for the production of the packing.

Packings of this kind which are systematically built up are used for the rectification and absorption and serve the material exchange between a liquid and a gaseous (or vapor-like) phase whereby also a heat exchange takes place simultaneously with the material exchange. The purpose of the packing is, in particular, to distribute the liquid in such a way that as large a liquid surface as possible is available for the material and heat exchange.

A packing of the aforementioned kind is known from the German Disclosure Publication No. 2 005 295. The known packing consists of several pairs of laminated grids crossing each other or being arranged in an irregular position. Each of the two laminated grids of a pair consists of laminated strips, bent into an approximate zigzag shape, which are connected at their bent points to form one piece and areal crossing points of the grid.

The design of such a known laminated grid is shown in FIG. 1 which indicates an enlarged isometric view of a grid mesh. The represented grid mesh is formed by means of zigzag-shaped successive laminated parts 1, 2 of a laminated strip 3 and two zigzag-shaped successive laminated parts 4, 5 of the adjacent laminated strip 6. The bending points 7, 8 where the laminated parts 1, 4 and 2, 5 are interconnected form areal crossing points of the grid. A plane A is plotted as the grid plane in which the centers 9, 10 of the areal crossing points 7, 8 of the grid are located. The laminated parts 1, 2, 4, 5 are, in the same way as the remaining laminated parts, inclined towards the grid plane A under an angle $\alpha$ whereby one portion of each laminated part is above the grid plane A and the other portion below the grid plane A. The two boundary planes of the laminated grid in parallel to the grid plane A have the reference A' and A''. The strip width of the laminated strips 3 is indicated by s, the thickness by t and the length of the larger diagonal of the approximately rhombic grid mesh by u. The angle which the adjacent zigzag-shaped laminated strips 3, 6 form at the crossing points 7, 8, i.e. the smaller angle of the mesh rhombus, is indicated by $\beta$.

The known laminated grid is produced as a kind of an expanded metal by cutting a tape into parallel strips which are interconnected at several points so that the intersection segments between which the strips adjacent to each other are interconnected have the same length and are staggered by half their lengths vis-a-vis the adjacent intersection segments. The described laminated grid is obtained by pulling apart the strips.

The laminated grids of the packing of the kind mentioned in the introduction are produced, in principle, in the same manner as the expanded metals but they differ from them in that the width s of the laminated parts is considerably larger than their thickness t while, in the case of the customary expanded metals, the width of the grid crosspieces corresponds approximately to their thickness.

Packings of the kind mentioned in the introduction have the advantage that a larger packing surface can be obtained in a simple manner using less material. This advantage results from the structure of the laminated parts of the grid, i.e. from the fact that the laminated parts are thin laminae with large surfaces in comparison with the material used.

However, the advantage of the large packing surface can only be made use of for the material exchange if, on the one hand, steps are taken that the liquid is uniformly distributed across the entire packing surface and all laminated strips of the packing are entirely moistened all around and, on the other hand, it is guaranteed that the pressure loss to which the gas (or vapor) rising in the column is subjected when passing through the packing is kept as low as possible, that the entire gas flow passes over the liquid in a uniformly distributed manner and transversely to the direction of the flow and that no partial flows of the gas can pass through the packing without getting into contact with the liquid.

In order to achieve the transverse distribution of the liquid, it is necessary that the packing itself distributes the liquid transversely to the direction of flow by means of its structure. In practice, it is actually not possible to supply the liquid in such a way that it is uniformly distributed across the cross-section of the packing. Even if this could be achieved—it would be extremely complex—it would not yet be sufficient because the liquid can flow together again within the packing and form channels if the structure of the packing does not avoid such a formation of channels by means of a constant transverse distribution of the liquid. Furthermore, the distribution of the liquid should be effected without the help of the gas flow since otherwise an undesirable dependence would develop on the respective gas load.

In order to achieve an optimum material exchange, care must also be taken that the surface of the liquid is constantly renewed, i.e. the liquid film passing over the surface of the packing should have as high a degree of turbulence as possible.

Tests on which the invention is based have given the following results: When the laminated strips of the known laminated grids are arranged transversely to the direction of flow, the pressure loss to which the gas rising in the column is subjected when passing through the packing is then extremely high when the laminated grids are arranged next to each other without larger interspaces. For this reason, the laminated grids in the packing known from the German Disclosure Publication No. 2 005 295 are obviously not arranged regularly next to each other but in pairs transversely towards each other in an irregular position. On the one hand, this has the disadvantage that only a low specific packing surface (packing surface per packing volume) is achieved and, on the other hand, considerable portions of the gas flow through the interspaces between the pairs of grids instead cross the liquid. Furthermore, a considerable portion of the liquid drops off the laminated parts, particularly off the ends of the laminated strips, and is not used for the material exchange with the arrangement of the laminated strips transversely to the direction of flow. When the laminated strips are arranged in the direction of the flow, the mentioned disadvantages are actually avoided but the liquid flows then along the zigzag-shaped laminated strips downward whereby neither the transverse distribution of the liquid is achieved which is necessary for a complete and uniform moistening of the entire laminated surface nor the turbulence which is required for the mixing and surface renewal of the liquid.

The invention is based on the task of creating a simple and inexpensively produceable packing of the kind mentioned in the introduction which uniformly distributes the liquid phase transversely to the direction of the flow, produces a high degree of turbulence in the liquid phase and keeps the pressure loss as low as possible of the gas or vapor flow even with a large specific packing surface.

By having the laminated strips run in the direction of the flow, a high pressure loss of the gas or vapor flow is avoided even with the high packing density which can be reached with the arrangement of the grid placed against each other in a staggered manner in such a way that the laminated strips of each grid project into the meshes of the two adjacent grids. A uniform distribution of the liquid phase transversely to the direction of the flow as well as a high turbulence in the liquid film are achieved by means of the design of the crossing points according to the invention, particularly the preferred design by means of which the liquid phase flowing down a laminated strip is directed, at least in part, across the crossing point to the adjacent laminated strip.

BRIEF DESCRIPTION OF THE DRAWINGS

Exemplified embodiments of the invention are further explained below with the help of the drawings, in which:

FIG. 2 is a lateral view of a portion of a packing of laminated grids layered against each other;

FIG. 3 is a cross-section through a portion of the packing of FIG. 2 taken on line III—III of FIG. 2;

DESCRIPTION OF THE PREFERRED EMBODIMENT

Figure 1:
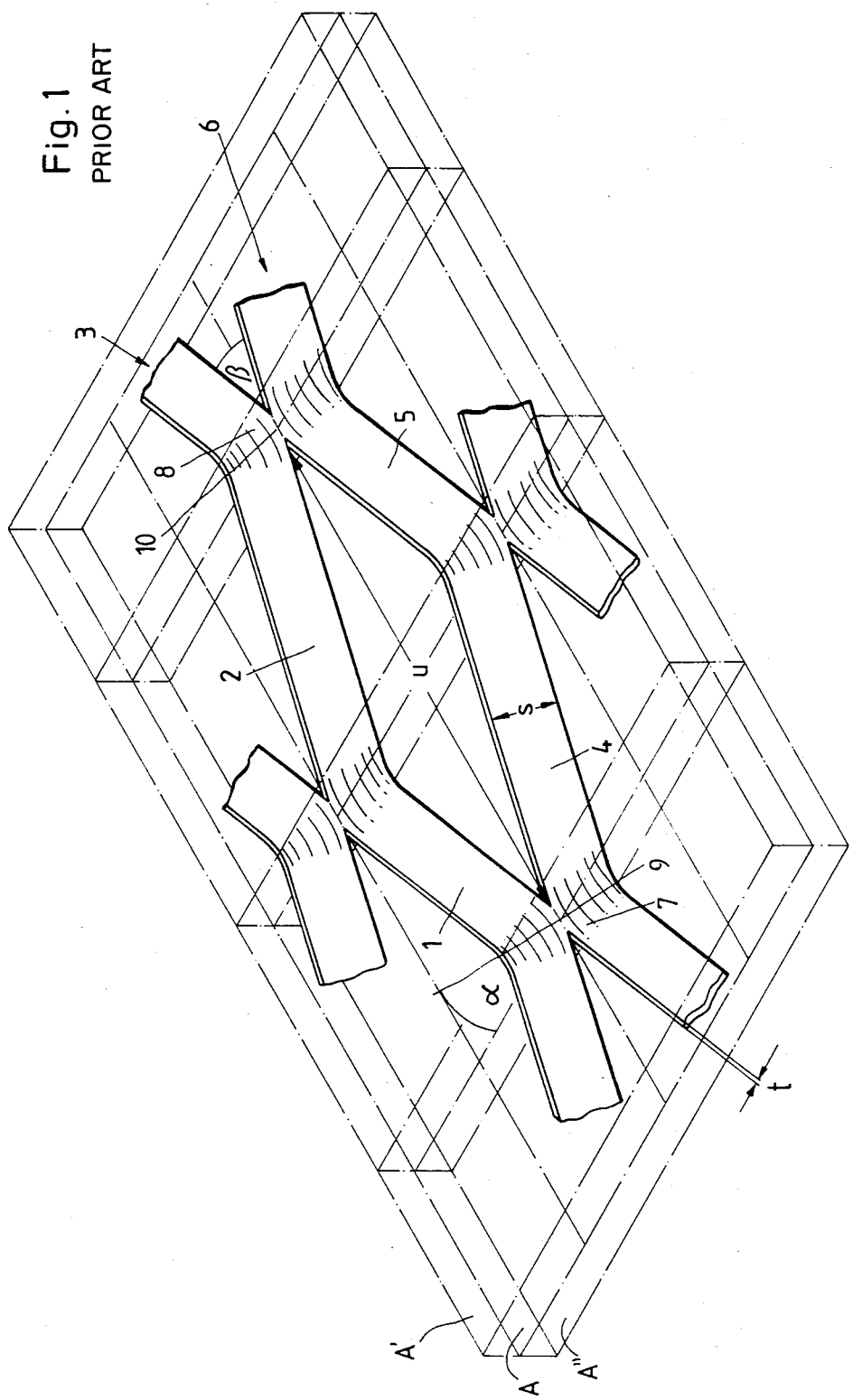
FIG. 1 is an enlarged fragmentary isometric view of a prior art grid mesh structure.

Each of the packings described in greater detail below consists of several laminated grids layered directly next to each other.

The laminated grids of the packings 11 and 12 shown in FIGS. 2, 3 and 4, 5 are all designed in the same way and consist of approximately zigzag-shaped bent laminated strips 13–17 and are interconnected at their bending points 18 as one piece and form there areal crossing points of the grid. The adjacent zigzag-shaped laminated strips 13–17 of each grid have triangular recesses 20, 21 (FIGS. 2 and 6) on both sides of each crossing point 18 at their outer edges so that the portions of the laminated parts adjacent to the crossing points are tapered in the direction of the crossing points. The recesses 20, 21 are longer than the width s of a laminated strip in the direction in which the laminated strips run in a zigzag shape and, transversely to it deeper than half of the strip width s. The length and the depth of the recesses which correspond to the basic side and to the pertinent height of the recess triangle are indicated by g and h in FIG. 2. Given the fact that the depth h of the recesses is greater than half the width s, the width k of the crossing surface is smaller than the width s of a laminated strip at its most narrow point.

As is shown in the form of examples in FIGS. 2, 3 and 4, 5, the laminated grids can be regularly layered against each other in different ways whereby, depending on the kind of the layering, packings of varying densities, i.e. packings with different specific surfaces, are obtained. Always the laminated parts of the first grid are indicated by the letter a, those of the second grid by the letter b, etc. in FIGS. 2, 3 and 4, 5. The grid planes are given the letters A, B, etc.

In the case of the two packings 11 and 12, the laminated parts of the first, third, fifth, etc. grid a, c, . . . , are inclined in the same sense towards the grid planes and the laminated parts of the second, fourth, sixth, etc. grid b, d, f, . . . in the opposite sense towards the grid planes. This is achieved with exactly equally structured grid by turning the second, fourth, etc. grid always by 180° in the grid plane against the first, third, etc. grid when layering the grids on top of each other to form the packing 11 or 12.

In the case of the packing 11, the centers of the crossing points of the first, third, fifth, etc. grid a, c, e, . . . are located on common straight lines vertical to the grid planes and, accordingly, the centers of the crossing points of the second, fourth, sixth, etc. grid b, d, f, . . . are located on common straight lines running through the centers of the meshes of the first, third, fifth, etc. grid a, c, e, . . . and vertical to the grid planes. In this way, a particularly dense packing, i.e. an especially high specific packing surface, is obtained. The boundary planes of each grid in parallel to the grid plane coincide in this instance with the grid planes of the two adjacent grids so that the the entire thickness of always three successive grids corresponds only to twice the thickness of a single grid.

In the case of the packings 12, the centers of the crossing points of all grids a, b, c, . . . are located on common straight lines, the packing has a smaller specific surface than the 11 but, instead, the pressure loss is somewhat lower of the gas phase.

Figure 4:
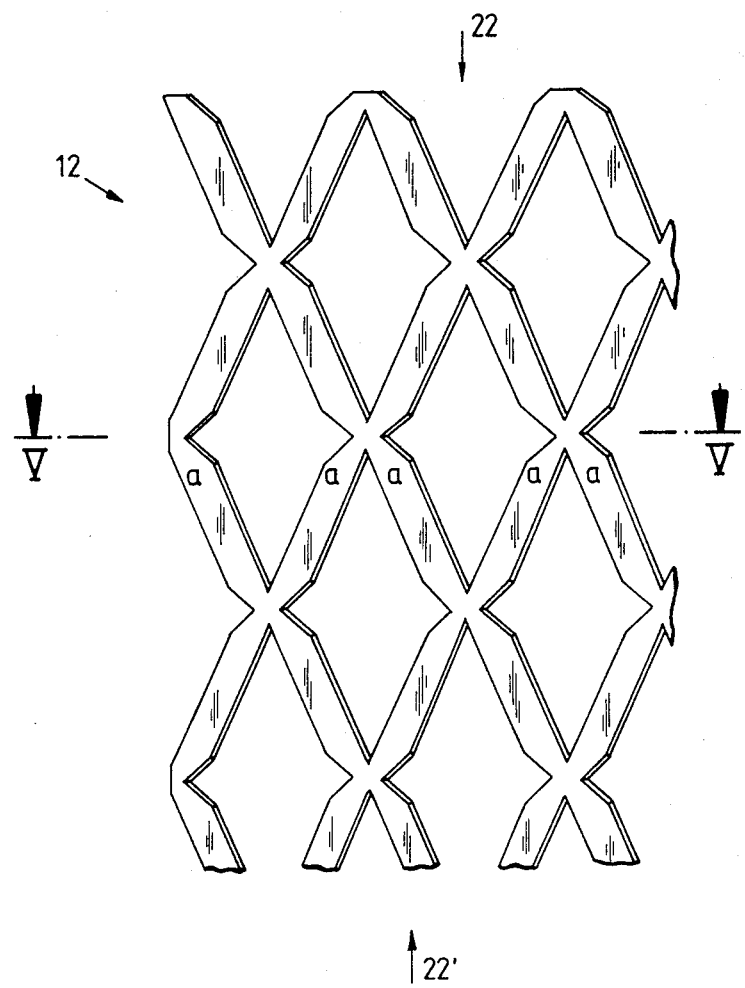
FIG. 4 is a lateral view of a portion of another packing which consists of the same laminated grids as the packing of FIGS. 2 and 3 but layered differently against each other.
Figure 5:
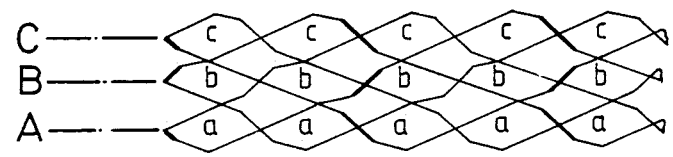
FIG. 5 is a cross-section through the portion of the packing of FIG. 4, taken substantially on line V—V of FIG. 4.
Figure 6:
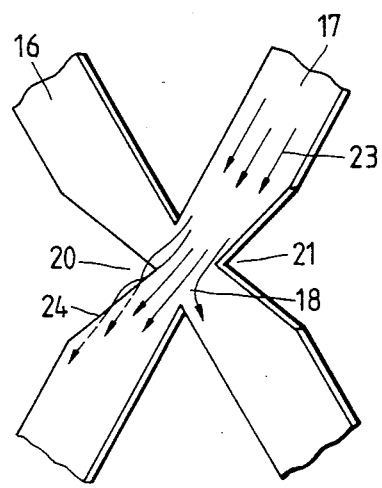
FIG. 6 is an enlarged view of a crossing point of one of the laminated grids of FIGS. 2 to 5 with arrows indicating the direction of the flow.

The packings are placed into the column in such a fashion that the zigzag-shape bent laminated strips 13–17 run in the axial longitudinal direction of the column, i.e. in that direction in which the liquid or the gas is supplied to the packing. The in-flow direction of the liquid is indicated in FIGS. 2 and 4 by means of an arrow 22 and the in-flow direction of the gas by means of an arrow 22′. The supplied liquid flows downward on the laminated strips 13–17 as indicated by arrows 23 in FIG. 2. As is shown in FIG. 6, the liquid 23 on the laminated strip 17 flowing down to one of the crossing points 18 is directed with the help of the tapered structure of the laminated part in such a manner that it flows transversely across the crossing point 18 to the adjacent laminated strip 16. This results in an optimum transverse distribution of the liquid and, when the adjacent laminated strip 16 carries liquid as well (not shown), in an optimum mixing and surface renewal of the two liquid flows at the crossing points. As is also shown in FIG. 6, a portion of the liquid flows, directly after having passed the crossing point, from the upper laminated part surface around the edge 24 limiting the recess 20 to the upper laminated part surface. In this way, it is guaranteed that the liquid covers both sides of the laminated parts and the liquid flowing down on the two sides of the laminated parts is always mixed again at the crossing points so that there is available a very large and constantly renewed liquid surface for the material exchange.

While, on the one hand, an optimum transverse distribution of the liquid is achieved in the individual laminated grids with the narrowed-down points of the laminated strips 13–17 resulting from the recesses 20, 21 at the crossing points 18, on the other hand, also a certain even though slight transverse distribution of the liquid is achieved between the individual grids, i.e. transversely to the grid planes, and an interaction between the liquid flows of adjacent grids by means of the direct layering against each other of all laminated grids of a packing. In this way, there develops also a certain turbulence, particularly in the case of packing 11, because the liquid flows indicated by the arrows 23 in FIG. 2 flow in an angle towards each other on the laminated parts of adjacent grids contacting each other.

Turbulence as well as a good transverse distribution is also reached in the gas or vapor phase with the packings 11, 12. This, in particular, because the laminated parts of adjacent grids are placed obliquely towards each other and, furthermore, in the case of packing 11, the laminated parts project into the meshes of the adjacent grids.

The packing 11 has proven to be particularly advantageous for the customary applications of rectification and absorption, especially because it has a very high specific surface and causes nevertheless only a slight pressure loss in the gas phase. On the other hand, the packing 12 can be better suitable for special applications in which the operation must take place under extremely low pressure.

In this connection, it should still be pointed out that the described transverse distribution of the liquid is effected in as well as between the laminated grids independently of the gas flow; it is, therefore, always optimally guaranteed even with only a slight gas flow.

The production of the packings 11, 12 will be explained below with the help of FIGS. 7 to 10. The laminated grid 27 shown in FIG. 7 which corresponds to the grids of the packings 11, 12 is obtained from the metal tape 28 shown in FIG. 8 as follows: The thin tape 28 is cut into several parallel strips 30 which are each interconnected at several points 29 and this in such a way that the intersection segments 31 between which the strips 30 adjacent to each other are interconnected at the points 29 have the same length and are staggered by half the length vis-a-vis the adjacent intersection segments 31. The strip width s is selected large in this instance in comparison with the thickness t of the tape 28, preferably in such a way that it amounts to twenty to thirty times the tape thickness 6.

A rhombic hole 32 is punched in the center of each of the intersection segments 31 in the two strips 30 adjacent to each other. The lengths of the two diagonals of the hole rhombus are chosen larger in this instance than the strip width s and this in such a fashion that the above indicated advantageous dimensions of the length g and of the depth h of the recesses 20, 21 are obtained in the condition when the grid is pulled apart. Subsequently, the strips 30 are pulled apart in the direction of the arrows 33 and that to such an extent that the angle $\beta$ which the adjacent strips 30 form with each other at the points 29 at which they are interconnected amounts preferably to at least 45° and at the most to 90°. After having pulled apart the strips 30, the laminated grid 27 has developed with the laminated strips running in a zigzag shape and its laminated parts are inclined towards the grid plane. The angle of inclination $\alpha$ which depends on the extent to which the strips 30 are pulled apart can be enlarged or reduced by means of subsequent operations. It is preferably selected in the range between 25° and 75°. The laminated grids 27 obtained in this manner are then placed on top of each other and connected with each other, for example, simply tied together tightly by means of wires or welded with each other.

Figure 10:
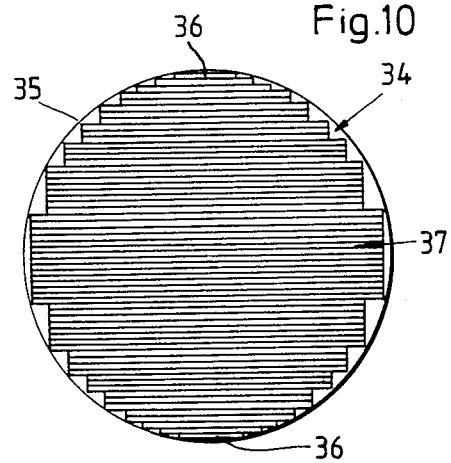
FIG. 10 is a top view of one of the packages of FIG. 9 on an enlarged scale.

As is shown in FIG. 10, the packing can be adjusted to a round column cross-section by placing next to each other grids with, step-by-step, increasing and again decreasing numbers of laminated strips and, thus, increasing and decreasing widths so that the cross-section of the packing 34 obtains, step-by-step, a shape adjusted to the round column cross-section 35. The two most narrow grids of the packing 34 are assigned the number 36 and one of the total of fourteen widest grids the number 37. What is essential is that the grids are adjusted, step-by-step, to the column cross-section only by adding or omitting one laminated strip each and the two zigzag-shaped laminated strips of each grid at the extreme outside are not interrupted for the exact adjustment to the column cross-section. It is achieved in this way that the liquid flowing down on the two extreme laminated strips neither drops off nor flows along the entire strip length but, as explained above, transversely across the crossing points to the adjacent laminated strips and, thus, flows back again into the inside of the packing. It cannot be avoided, of course, that empty spaces develop between the packing edge and the column wall by means of this step-by-step adjustment of the packing to the column cross-section. However, they are negligible in connection with larger column diameters and can be filled up if necessary, for example, by means of a cut-in fabric tape placed around the packing whereby an undesirable gas flow is also avoided along the column wall.

Figure 9:
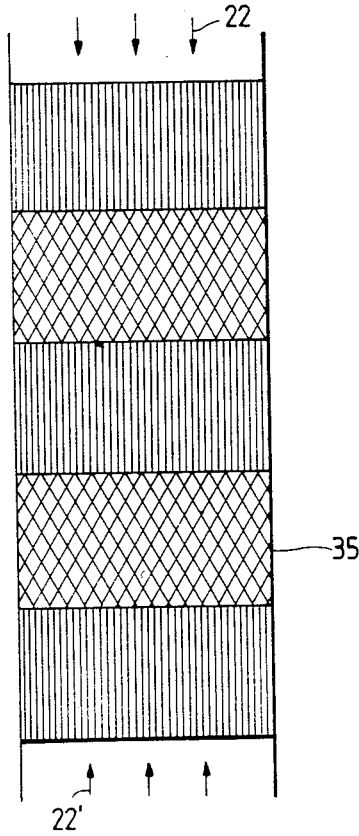
FIG. 9 is a schematic axial longitudinal section through several packings placed on top of each other in a column.

As has been shown schematically in FIG. 9, several packings are placed on top of each other with the laminated grids in parallel to the column axis in a column for the rectification or absorption. The grids of packings adjacent to each other are arranged approximately in a right angle towards each other, i.e. the packings are always turned by 90° vis-a-vis the preceding packing when inserting them. In this way, a particularly homogeneous transverse distribution is achieved of the liquid flowing through the column in the direction of the arrows 22 and of the gas flowing in the direction of the arrows 22′ by compensating for differences between the transverse distribution of the phases in the laminated grids and the transverse distribution of the phases transversely to the grid planes of a packing.

As mentioned before, the laminated grids can also be placed next to each other in another way than in the case of the packings 11, 12. For example, the laminated parts of all grids can be inclined in the same sense towards the grid planes. In this instance, the grids can be staggered against each other as the grids of the packing 11, i.e. the centers of the crossing points of the even-numbered grids can be on common straight lines running through the centers of the meshes of the odd-numbered grids. In this case, a packing density is attained which is between those of the packings 11 and 12. However, the grids can also be staggered in another way towards each other; for example, the centers of the crossing points of the grids can be staggered towards each other in such a fashion that the intersections in which a horizontal intersection plane cuts the areal crossing points of the grids placed against each other are in a straight line with each other. The packing density corresponds then to that of the packing 12. Furthermore, by suitably staggering the grids with laminated strips inclined in the same sense towards the grid planes, as dense a packing can be obtained as in the case of the packing 11. In this instance, the boundary planes of each grid in parallel to the grid plane coincide, as in the case of the packing 11, with the grid planes of the two adjacent grids.

Figure 11:
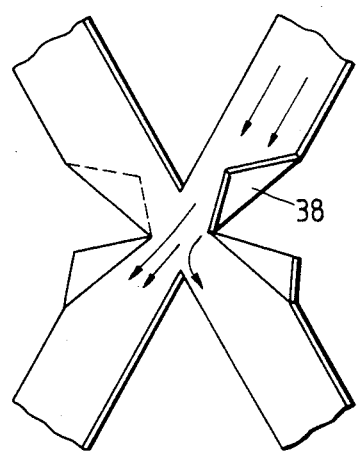
FIG. 11 is an enlarged view similar to FIG. 6 showing a modified form of the crossing point of FIG. 6.

The laminated strips can also be structured differently in order to direct the liquid across the crossing points. In the case of the alternative shown in FIG. 11, triangular-shaped lobes 38 are bent off the laminated strips on both sides of each crossing point for this purpose. In order to guide the liquid across the crossing points, the laminated strips could also have elevations or depressions at the crossing points, for example, channels or grooves, which run in accordance with the desired course of the liquid flows from one laminated part of one of the laminated strips across the crossing point to the following laminated part of the adjacent laminated strip. Moreover, the outer edges of the laminated strips could also be shaped differently, for example, they could have semi-circular recesses.

Figure 13:
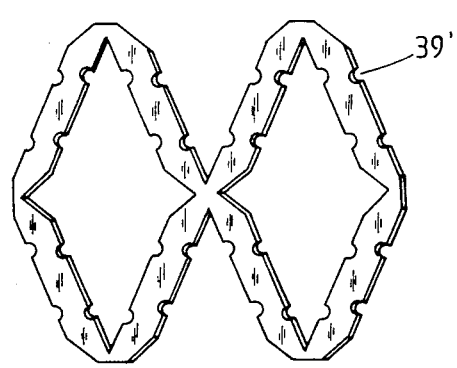
FIG. 13 is a lateral view of two meshes of another alternative form of the laminated grids of FIGS. 2 to 5.
Figure 12:
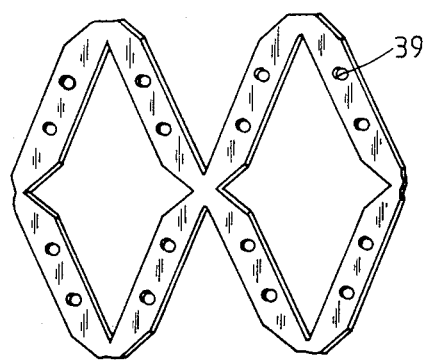
FIG. 12 is a lateral view of two meshes of an alternative form of the laminated grids of FIGS. 2 to 5.
Figure 8:
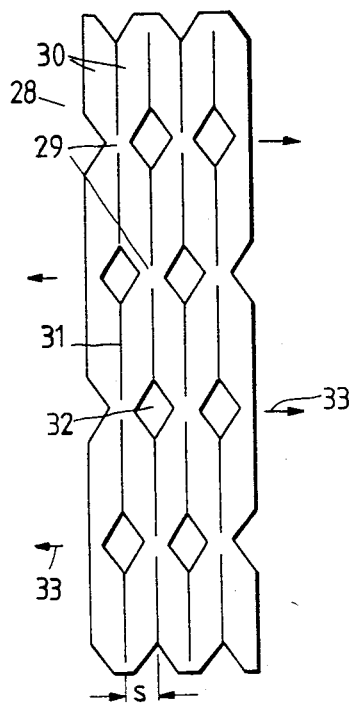
FIGS. 7 and 8 are a portion of a laminated grid of the packing of FIGS. 2 to 5 on a reduced scale and a tape prepared for its production.
Figure 7:
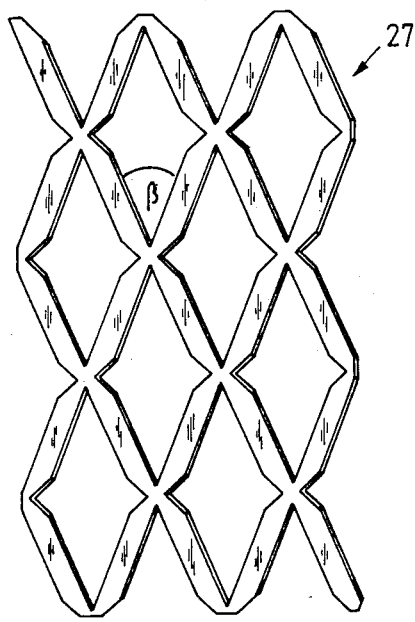

In order to further reduce the pressure loss of the gas phase and also to increase the turbulence in the liquid phase, the laminated parts can be provided with holes 39 or lateral recesses 39′ as shown in FIGS. 12 and 13.

Figure 14:
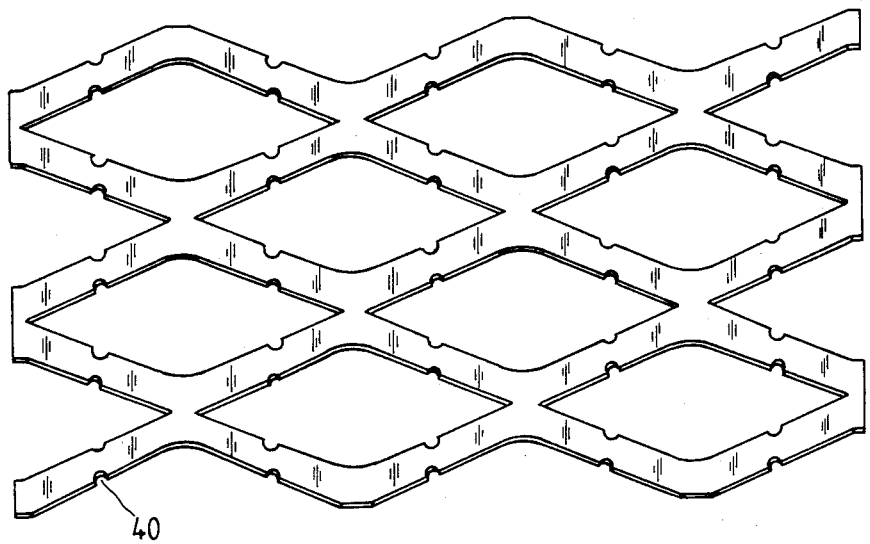
FIG. 14 is a lateral view of a laminated grid with lateral recesses for a packing with laminated grids engaging into each other.
Figure 15:
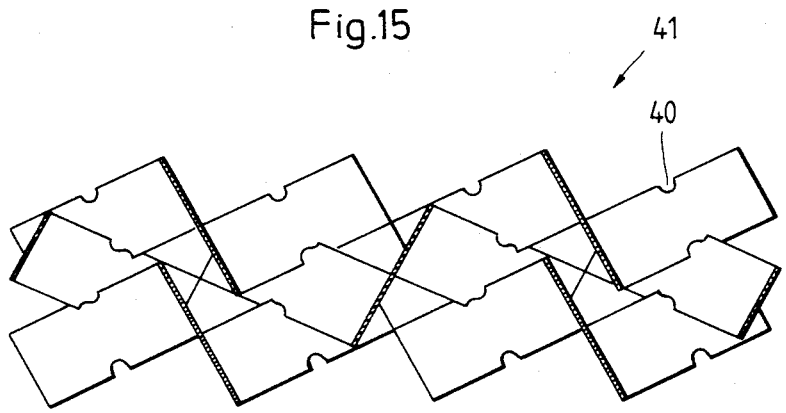
FIG. 15 is a cross-section through a portion of a packing with laminated grids engaging into each other, on an enlarged scale.

As explained above, the transverse distribution of the liquid is effected, on the one hand, in the laminated grids and, on the other hand, between the laminated grids of a packing. However, the size of the liquid distribution is not the same in the packings described so far: The liquid is better distributed in the individual grids than between them. In order to obtain also an optimum transverse distribution of the liquid from grid to grid, the packing can be designed in such a manner that the laminated parts of adjacent grids engage into each other at recessed parts at the edges. FIG. 14 shows a laminated grid intended for such a packing with recessed parts at the edges 40 and FIG. 15 a cross-section through a portion of such a packing 41. The laminated grids of this packing 41 are similarly arranged as those of the packing 11 with the laminated parts of grids next to each other being inclined in the opposite sense to the grid planes and the centers of the crossing points of the even-numbered grids being on common straight lines running through the centers of the meshes of the odd-numbered grids. It is obvious that, in the case of the packing 41, the liquid flows from the edges of the laminated parts of one grid on the laminated parts of the adjacent grid whereby also a high degree of turbulence develops besides the good transverse distribution from grid to grid. The packing 41 has additionally the advantage of a particularly high packing density. It goes without saying that, also in the case of the packing 41, the crossing points are designed in such a way that the liquid phase flows transversely across the crossing points for which purpose preferably the outer edges of the laminated strips are provided with the recesses 20, 21. These recesses are not shown in FIGS. 14 and 15 only for reasons of a simpler representation.

Figure 16:
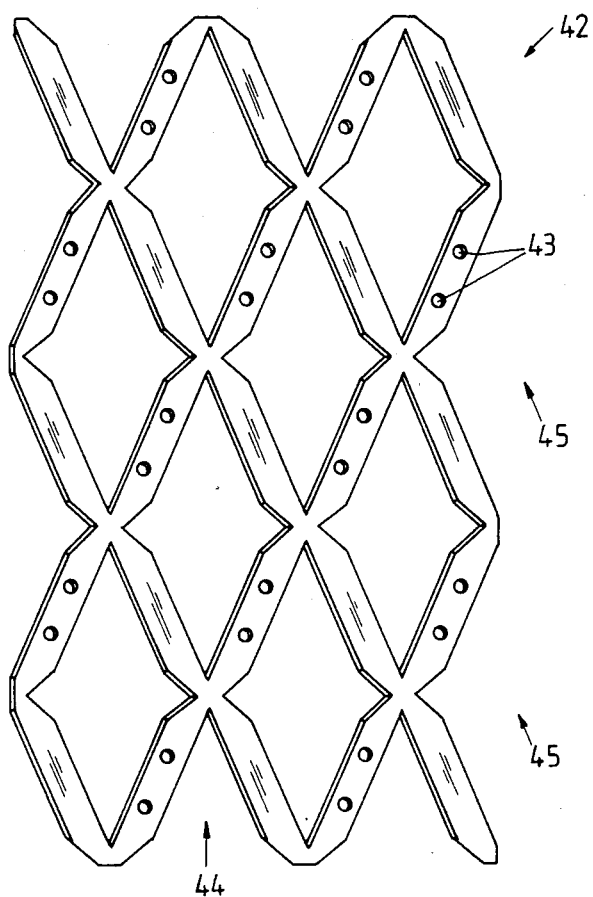
FIG. 16 is a lateral view of a laminated grid whose laminated grids are alternately provided with holes.

The zigzag-shaped successive laminated parts of each laminated strip of the laminated grid 42 shown in FIG. 16 are provided alternatively with pairs of holes 43 whereby also lateral recesses 39′ according to FIG. 13 can be provided instead of or in addition to the pairs of holes. In this way, in addition to the deflection through the laminated parts, the gas flow is directed transversely to the direction of the flow 44 by opening up a path in the direction of the arrows 45 for the gas flow running upward obliquely to the direction of the flow 44 by means of these alternating holes 43.

Figure 17:
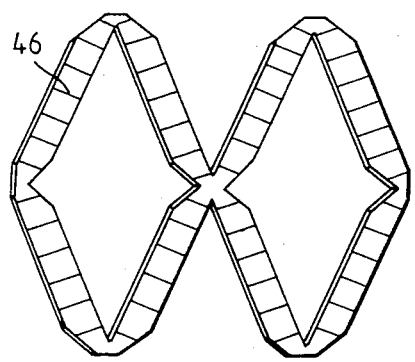
FIG. 17 is a lateral view of two meshes of an alternative form of the laminated grids of FIGS. 2 to 5.

Additionally, the laminated strips can be provided with elevations or depressions running transversely to the longitudinal direction of the strips. As an example, FIG. 17 shows two meshes of a laminated grid made of a corrugated metal sheet with channels 46 running transversely to the longitudinal direction of the strips. Packings made of such laminated grids are particularly advantageous for non-moistening or incompletely moistening liquids for which the transverse channeling prevents the formation of drops or combined flows and guarantees a uniform distribution across the laminated surface. It is, furthermore, achieved by the channels 46 that turbulence develops also between the crossing points in the liquid phase.

The laminated grids described so far consist all of a thin metal sheet. However, the laminated grids can also be made of a plastic foil or of a fabric tape.

I claim:

1. Packing (11) for vapor-liquid and gas-liquid contacting in a material exchange column (35) with liquid supply means (22) and vapor or gas supply means (22′) and a cavity below said liquid supply means (22) for receiving at least one packing, the liquid supplied by the liquid supply means (22) flowing downward through the packing and the vapor or gas supplied by the vapor or gas supply means (22′) streaming in vertical direction through the packing, the packing (11) comprising a plurality of laminated grids (a, b, c, . . . ) each having a grid plane (A, B, C, . . . ), each grid (a, b, c, . . . ) being formed of one integral piece and consisting of a plurality of approximately zigzag-shaped bent laminated strips (13–17), adjacent strips (13/14, 14/15, 15/16, 16/17) of each grid (a, b, c, . . . ) being interconnected at their bending points so as to form thereat areal junction zones (18) of the grid (a, b, c, . . . ), each laminated strip (13–17) having segments following each other successively in zigzag being inclined toward the grid plane (A, B, C, ...) and the segments of adjacent strips (13,14,14/15,15/16, 16/17) bounding substantial quadrilateral mesh openings having a larger and a smaller diagonal, the segments bounding each of said mesh openings diverging in a first pair at an acute angle from one end of said larger diagonal and converging in a second pair at an acute angle toward the other end of said larger diagonal, and the packing (11) being adapted to be mounted in the cavity of a column (35) in such a way that said larger diagonals are substantially vertical and parallel to the liquid and to the vapor or gas flow; the lower portions of the two segments of each of said second pairs converging downwardly into said areal junction zones (18) being provided near the junction zones (18) with liquid flow guide means descending towards said junction zone (18) at an angle to each other greater than the acute angle between said two segments of said second pairs, whereby the horizontal component of the liquid flow along said two segments of said second pairs is adapted to be increased at said lower portions near the junction zone (18) to such an extent that the liquid flows to a major extent across the said junction zone (18) and that on the other hand the liquid does not trickle off or dam up at the liquid flow guide means.

2. Packing according to claim 15, in which the laminated strips (13–17) of each grid (a, b, c, ...) have recesses (20, 21) on both sides of each junction zone (18) extending into the lower portions of the segments of each of said second pairs and being designed in such a manner that said lower portions are gradually tapered in the downward direction to the junction zone (18) and the borders thereof, bordering said recesses comprising said liquid flow guide means.

3. Packing according to claim 2, in which the area of each junction zone (18) is reduced by the said recesses (20, 21) to such an extent, that the horizontal dimension (k) of the junction zone (18) narrows down to less that the width (s) of a laminated strip (13–17).

4. Packing according to claim 1, in which the laminated strips (13–17) of each grid (a, b, c, ...) have recesses (20, 21) on both sides of each junction zone (18) extending into the lower portions of the segments of each of said second pairs and into the upper portions of the segments of each of said first pairs, the borders of said lower portions, bordering said recesses (20, 21), constituting said liquid flow guide means, and the recesses (20, 21) being longer than the width (s) of a laminated strip (13–17) in the downward direction and being, transversely to it, within the junction zone (18) deeper than half the width (s) of a laminated strip.

5. Packing according to claim 1, in which the laminated strips (13–17) have holes (39;43) and/or lateral recesses (39') between the junction zones (18).

6. Packing according to claim 5, in which the segments of each laminated strip (13–17) following each other successively in zigzag shape are alternately provided with the holes (43) and/or lateral recesses.

7. Packing according to claim 1, in which all laminated grids (a,b,c, ...) are directly placed against each other.

8. Packing according to claim 7, in which the laminated strips of the first, third, fifth, etc. grid are inclined in the same sense to the grid planes (A, B, C, ...) and the laminated strips of the second, fourth, sixth, etc. grid (b, d, f, ...) in the opposite sense to them.

9. Packing according to claim 1, in which the laminated grids (a, b, c, ...) are placed against each other in a staggered manner in such a way that the laminated strips of each grid project into the meshes of the two adjacent grids.

10. Packing according to claim 1, in which the laminated strips of adjacent grids engage into each other at recessed portions at the edges (40).

11. Packing according to claim 1, in which the centers of the junction zones of the first, third, fifth, etc. grid (a, b, c, ...) are located on common straight lines vertical to the grid planes (A, B, C, ...) and the centers of the junction zones of the second, fourth, sixth, etc. grid (b, d, f, ...) are located on common straight lines running through the centers of the meshes of the first, third, fifth, etc. grid (a, b, c, ...) vertically to the grid planes (A, B, C, ...).

12. Packing according to claim 1, in which grids (36,37) with a varying number of laminated strips are placed against each other so that the packing cross-section (34) has a shape adapted on a step-by-step basis to a round column cross-section (35) and the two outer zigzag-shaped laminated strips of each grid are not interrupted.

13. Packing according to claim 1, in which the laminated strips are provided with elevations and depressions, are grooved (46), for example, which run transversely to the longitudinal direction of the strips.

14. Packing according to claim 1, in which the width (s) of the laminated strips (13–17) amounts to twenty to thirty times their thickness (t).

* * * * *